(12) United States Patent
Tanabe

(10) Patent No.: US 12,050,437 B2
(45) Date of Patent: Jul. 30, 2024

(54) ELECTRONIC WATCH

(71) Applicant: Seiko Epson Corporation, Tokyo (JP)

(72) Inventor: Takuya Tanabe, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 462 days.

(21) Appl. No.: 17/510,489

(22) Filed: Oct. 26, 2021

(65) Prior Publication Data

US 2022/0128952 A1    Apr. 28, 2022

(30) Foreign Application Priority Data

Oct. 27, 2020 (JP) .................................. 2020-179872

(51) Int. Cl.
*G04G 19/12* (2006.01)
*G06F 1/3212* (2019.01)
*G06F 1/3234* (2019.01)
*G04G 9/00* (2006.01)

(52) U.S. Cl.
CPC ............ *G04G 19/12* (2013.01); *G06F 1/3212* (2013.01); *G06F 1/3234* (2013.01); *G04G 9/0064* (2013.01)

(58) Field of Classification Search
CPC .... G04G 19/12; G04G 9/0064; G06F 1/3212; G06F 1/3234
See application file for complete search history.

(56) References Cited

U.S. PATENT DOCUMENTS

| | | | | |
|---|---|---|---|---|
| 6,320,822 B1 * | 11/2001 | Okeya | .................... | G04G 19/12 307/130 |
| 6,483,781 B2 * | 11/2002 | Igarashi | ................. | G04G 19/12 368/204 |
| 2003/0165083 A1 * | 9/2003 | Maruyama | ............. | G04G 19/12 368/28 |
| 2016/0259304 A1 * | 9/2016 | Fujisawa | ................ | G04R 20/06 |
| 2019/0079463 A1 * | 3/2019 | Hirota | .................... | G04C 10/04 |
| 2020/0081404 A1 * | 3/2020 | Maeda | .................... | H02P 29/40 |

FOREIGN PATENT DOCUMENTS

JP    2006-153537 A    6/2006
JP    2019-158789 A    9/2019

* cited by examiner

*Primary Examiner* — Edwin A. Leon
*Assistant Examiner* — Sean R Brannon
(74) *Attorney, Agent, or Firm* — Harness, Dickey & Pierce, P.L.C.

(57) ABSTRACT

The electronic watch includes a controller configured to perform switching between a time display mode which displays a time, a modification mode in which at least one of hands is moved in accordance with an operation of the operation device, and a power saving mode which consumes less power than in the time display mode by stopping at least one of the hands. The controller switches to the power saving mode when a battery voltage is detected to be less than a first voltage threshold value while the time display mode is performed, and switches to the power saving mode when the battery voltage to be less than a second voltage threshold value which is lower than the first voltage threshold value while the modification mode is performed.

8 Claims, 9 Drawing Sheets

ELECTRONIC WATCH

The present application is based on, and claims priority from JP Application Serial Number 2020-179872, filed Oct. 27, 2020, the disclosure of which is hereby incorporated by reference herein in its entirety.

BACKGROUND

1. Technical Field

The present disclosure relates to an electronic watch.

2. Related Art

An electronic watch in which a normal mode in which a current time measured by a time measurement means is displayed on a time display means and a power saving mode in which at least a part of the time display means is stopped are provided, and the normal mode is shifted to the power saving mode to reduce a power consumption when a battery voltage drops to be equal to or less than a first voltage reference value is known (refer to, for example, JP-A-2006-153537).

In the electronic watch, a normal reference value which is a voltage threshold value when the hands are moving normally and a fast-forward reference value which is a voltage threshold value when the hands are moving in fast forward are set as the first voltage reference values, and the fast-forward reference value is set to a voltage value higher than the normal reference value. For example, the normal reference value is set to 1.15 V, and the fast-forward reference value is set to 1.20 V.

In the electronic watch, in the normal mode, when the battery voltage is greater than the normal reference value, a normal hand movement continues without shifting to the power saving mode. In this state, a user may perform an operation to move the hands in fast forward. In this case, when the battery voltage is greater than the normal reference value and is less than or equal to the fast-forward reference value, the power saving mode is shifted to, and the movement of the hands in fast forward is not able to be performed. Therefore, even though the normal hand movement is being performed, when the user performs a fast-forward movement operation of the hands, the power saving mode is immediately performed, and thus usability is lowered.

SUMMARY

The electronic watch of the present disclosure includes a plurality of hands, a rechargeable battery, a battery voltage detection controller configured to detect a voltage of the battery, an operation device including a crown or a button, and a controller configured to perform switching between a time display mode which displays a time, a modification mode in which at least one of the hands is moved in accordance with an operation of the operation device, and a power saving mode in which less power is consumed than in the time display mode by stopping at least some of the hands, wherein the controller switches to the power saving mode when a battery voltage detected by the battery voltage detection device is detected to be less than a first voltage threshold value while the time display mode is performed, and switches to the power saving mode when the battery voltage is detected to be less than a second voltage threshold value which is lower than the first voltage threshold value while the modification mode is performed.

DESCRIPTION OF EXEMPLARY EMBODIMENTS

First Embodiment

An electronic watch 1 according to a first embodiment of the present disclosure will be described below with reference to the drawings.

Figure 1:
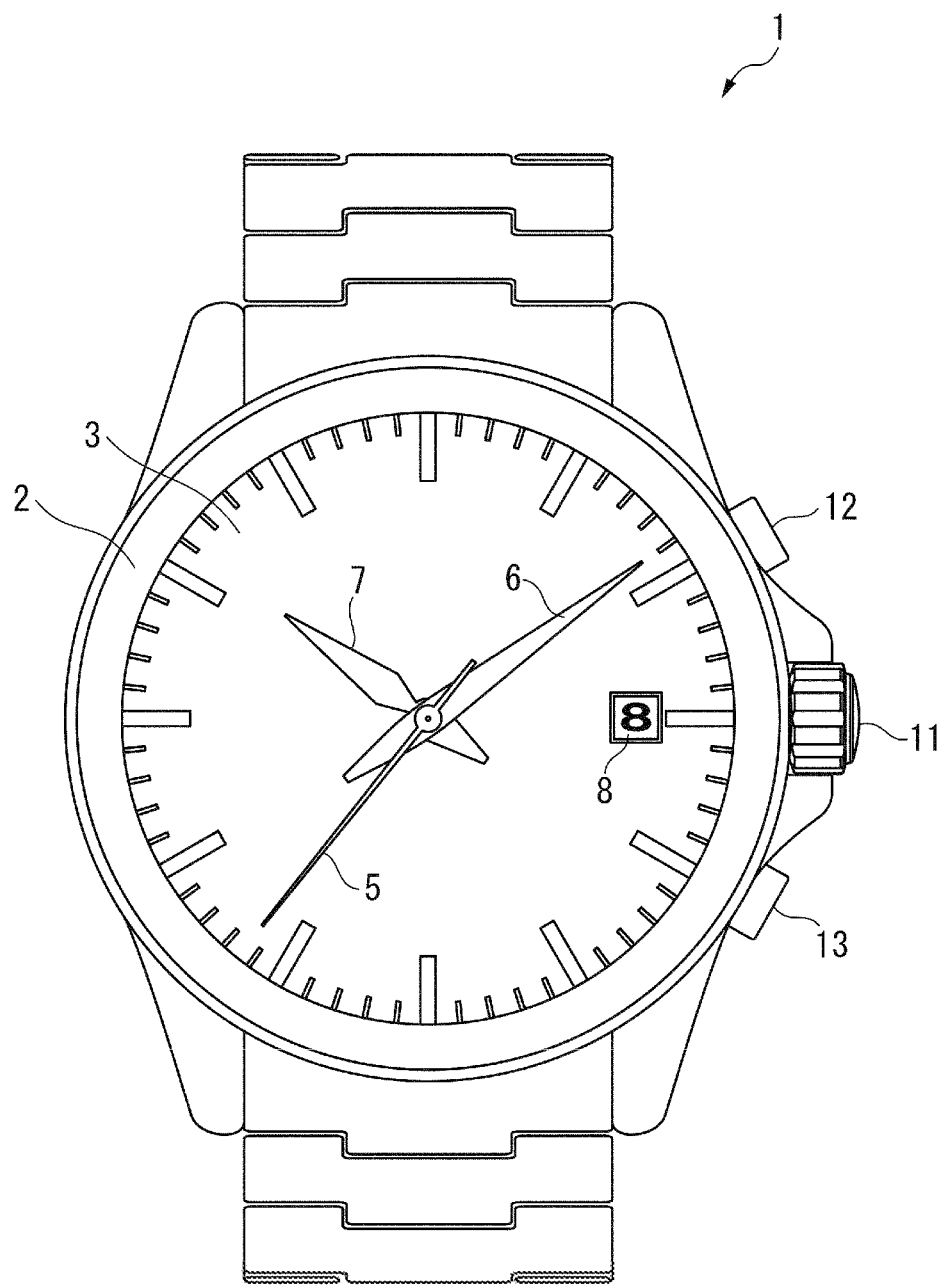
FIG. 1 is a front view showing an electronic watch according to an embodiment.

As shown in FIG. 1, the electronic watch 1 is a watch which is worn on a user's wrist, and includes an outer case 2, an dial 3 having a disk shape, a movement (not shown) a second hand 5, a minute hand 6, and an hour hand 7 which are hands, a date indicator 8, a crown 11 and buttons 12 and 13.

Figure 2:
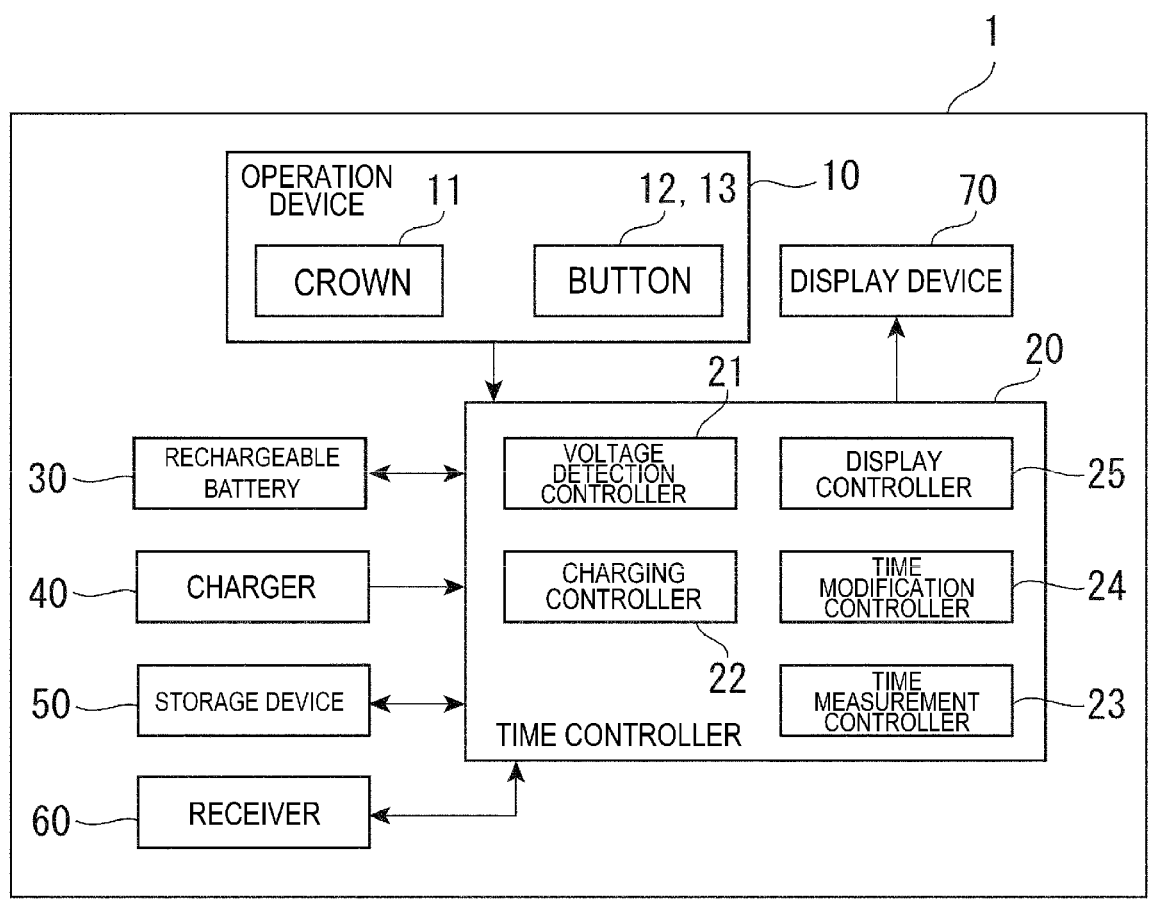
FIG. 2 is a block diagram showing a configuration of the electronic watch according to the embodiment.

As shown in FIG. 2, the electronic watch 1 includes an operation device 10, a time controller 20, a rechargeable battery 30, a charger 40, a storage device 50, a receiver 60, and a display device 70.

The operation device 10 is configured of the crown 11 and the buttons 12 and 13. The crown 11 is movable to a zero-stage position, a one-stage position, and a two-stage position. Here, the zero-stage position of the crown 11 is a pressed position, and the one-stage position or the two-stage position is a drawn position. In the present embodiment, when the crown 11 is pressed into the zero-stage position, a time display mode which displays a time with the hands is performed. In addition, when the crown 11 is drawn to the one-stage position, a modification mode in which a date may be manually modified is performed, and when the crown 11 is drawn to the two-stage position, a modification mode in which time is manually modified is performed. That is, when the crown 11 is located in the pressed position, the time display mode is performed, and when the crown 11 is located in the drawn position, the modification modes are performed.

As shown in FIG. 2, the time controller 20 includes a voltage detection controller 21, a charging controller 22, a time measurement controller 23, a time modification controller 24, and a display controller 25.

The voltage detection controller 21 detects the battery voltage of the rechargeable battery 30 at a constant period.

The charging controller 22 controls charging of the rechargeable battery 30 from the charger 40. For example, the charging controller 22 performs the charging of the rechargeable battery 30 when a charging voltage due to the charger 40 is equal to or greater than a threshold value, and performs control such as interrupting the charging of the rechargeable battery 30 when the charging voltage due to the charger 40 is reduced to below a threshold value.

The time measurement controller 23 includes a crystal oscillator and the like which is driven by electric power accumulated in the rechargeable battery 30, and measures an internal time using a reference signal based on an oscillation signal of the crystal oscillator.

The time modification controller 24 modifies internal time data 520 which will be described later when a standard radio wave is received or when a time zone is manually modified. Furthermore, also when a display time is manually modified by the operation device 10, the internal time data 520 is modified.

The display controller 25 controls the display device 70 in accordance with the internal time data 520, and displays the internal time using the second hand 5, the minute hand 6, the hour hand 7, and the date indicator 8.

The rechargeable battery 30 is a rechargeable and dischargeable battery, for example, and is constituted as a button type secondary battery. The charger 40 is a means for charging the rechargeable battery 30, and can use, for example, a solar power generation device which generates electric power by light energy. The charger 40 is not limited to a solar power generation device, and various types of power generation devices can be used as the charger 40, such as a power generation device which generates electric power by rotating a rotor with a rotating weight, a heat generation device which generates electric power using thermal energy, a piezoelectric power generation device which utilizes a piezoelectric effect, a power generation device which uses a charged film, a power generation device which generates electric power by external induction such as floating radio waves, or the like.

The receiver 60 includes an antenna which receives the standard radio wave and a receiving circuit which processes a signal received by the antenna, and outputs time information to the time controller 20.

Figure 3:
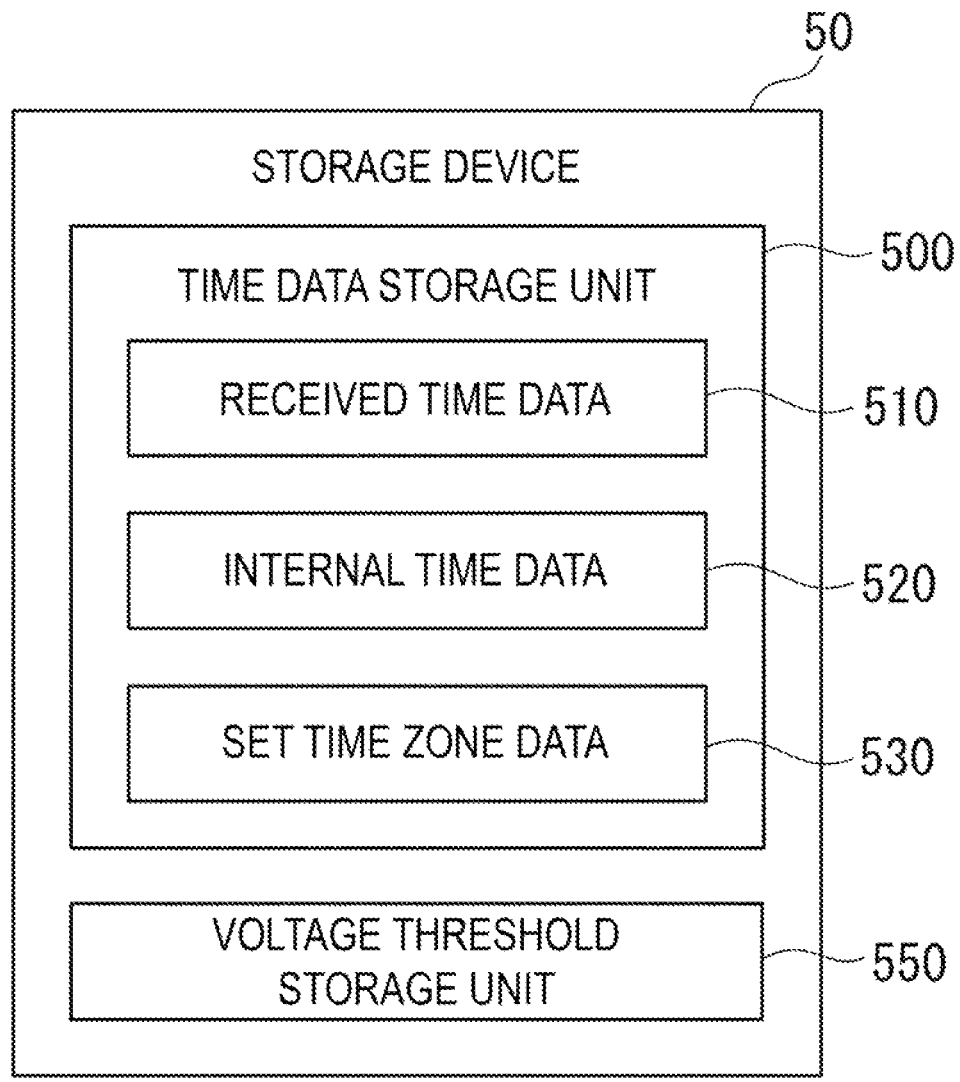
FIG. 3 is a block diagram showing a configuration of a storage device according to the embodiment.

As shown in FIG. 3, the storage device 50 includes a time data storage unit 500 and a voltage threshold storage unit 550. The time data storage unit 500 stores received time data 510, internal time data 520, and set time zone data 530.

The time information received by the receiver 60 is stored in the received time data 510.

The internal time which is updated by the time measurement controller 23 is stored in the internal time data 520. When the receiver 60 receives the standard radio wave and the received time data 510 is updated, the internal time data 520 is updated with received time information.

A time zone of the display time is stored in the set time zone data 530. For example, in a case in which JJY which is a standard radio wave of Japan is received and time information is stored in the received time data 510, time zone data for UTC+9 hours is stored in the set time zone data 530.

Further, in a case in which the operation device 10 is operated to manually change the time zone, the set time zone data 530 is changed, and the internal time data 520 is also changed in conjunction with the set time zone data 530. For example, when the button 13 is pushed for a predetermined time to shift to a time zone selection mode, the second hand 5 moves to a position indicating a current time zone. Then, when the button 12 is pressed, the second hand 5 moves in a clockwise direction, and when the button 13 is pressed, the second hand 5 moves in a counterclockwise direction, and the time zone stored in the set time zone data 530 can be changed in conjunction with such movements. When the buttons 12 and 13 are pressed and thus the time zone stored in the set time zone data 530 is changed, the internal time stored in the internal time data 520 is also changed. For example, when the set time zone data 530 is set back from UTC+9 hours to UTC+8 hours for one hour, the time of the internal time data 520 is also modified to a time of −1 hours.

A voltage threshold value for switching between the normal operation mode and the power saving mode is stored in the voltage threshold storage unit 550.

Figure 4:
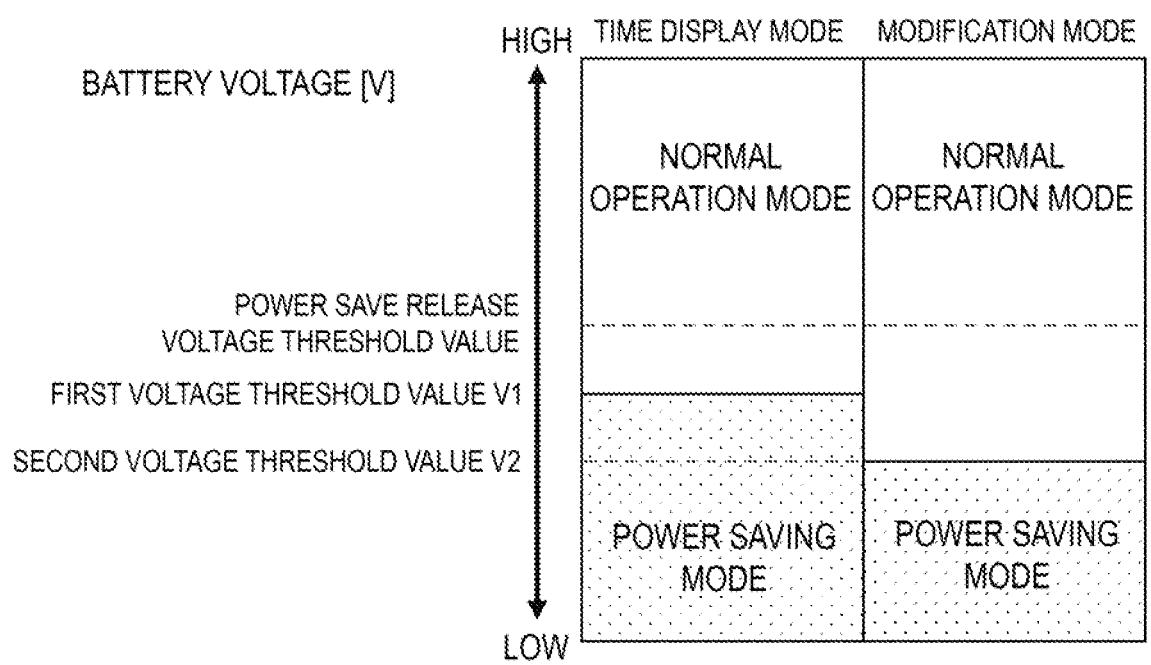
FIG. 4 is a schematic diagram showing a relationship between a time display mode, a modification mode, and a voltage threshold value according to the embodiment.

Specifically, as shown in FIG. 4, a first voltage threshold value V1 for determining a shift from the normal operation mode to the power saving mode during the time display mode, a second voltage threshold value V2 for determining a shift from the normal operation mode to the power saving mode during the modification mode, and a power save release voltage threshold value for releasing the power saving mode during the normal operation mode and during the modification mode and determining a shift to the normal operation mode are stored.

Here, the second voltage threshold value V2 is set to a voltage value which is lower than the first voltage threshold value V1. Further, the power save release voltage threshold value is set to a voltage value which is higher than the first voltage threshold value V1. Thus, V2<V1<power save release voltage threshold value is set.

Figure 5:
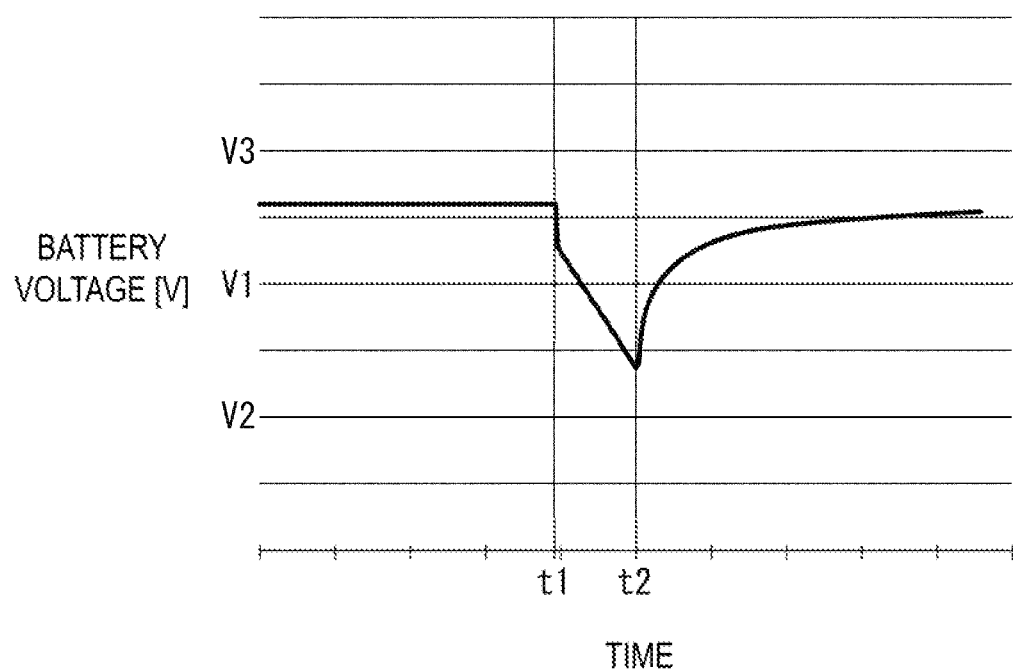
FIG. 5 is a graph showing a change in a battery voltage during a fast-forward operation according to the embodiment.

Also, FIG. 5 is a graph showing an example of a change in the battery voltage when a fast-forward operation of the hands is performed in the modification mode, and a large current flows. As shown in FIG. 5, when the fast-forward operation starts at time t1, the battery voltage also drops and falls below the first voltage threshold value V1. On the other hand, when the fast-forward operation ends at time t2, a current consumption also returns to a normal level, and thus the battery voltage gradually recovers to the voltage before the fast-forward operation. However, a time taken until the voltage returns to the original level is longer than a time over which the voltage drops. That is, in such an example, even if the battery voltage temporarily drops due to the fast-forward operation, there is no need to shift to the power saving mode because it gradually recovers when the fast-forward operation is ended.

The display device 70 includes the second hand 5, the minute hand 6, and the hour hand 7 which are hands, the date indicator 8, and a plurality of stepping motors which move these hands. In the present embodiment, the hands are not limited to only the second hand 5, the minute hand 6, and the hour hand 7, and also include a disk-shaped member such as the date indicator 8 or a day wheel. Furthermore, the hands are not limited to displaying the time, and also may include a member such as a mode hand or an indicator hand which is driven by a stepping motor and indicates various types of information and conditions.

The time controller 20 compares the battery voltage detected by the voltage detection controller 21 with the voltage threshold value stored in the voltage threshold storage unit 550, and performs control by switching between the normal operation mode and the power saving mode. In addition, the time controller 20 switches and controls the time display mode and the modification mode in accordance with a position of the crown 11 and an operation of the button.

The modification mode is a mode in which at least one of the hands can be moved in accordance with an operation of the operation device 10, and specifically includes at least one of modes described below. In the present embodiment, the modification mode includes a mode in which the crown 11 is drawn to the two-stage position to manually modify the time, and a mode in which the crown 11 is drawn to the one-stage position to manually modify the date. In addition, the modification mode includes a forced reception mode which is performed by the button 12 being pushed for a predetermined time, for example, 3 seconds or more in a state in which the crown 11 is in the zero-stage position, a time difference modification mode which is performed by the button 13 being pushed for a predetermined time, for example, 3 seconds or more in the state in which the crown 11 is in the zero-stage position, and a reference alignment mode which is performed by the buttons 12 and 13 being pushed simultaneously for a predetermined period of time, for example, 3 seconds or more in the state in which the crown 11 is in the zero-stage position.

Further, in a case in which a plurality of modification modes are provided, in at least one modification mode, the second voltage threshold value V2 which is lower than the first voltage threshold value V1 in the time display mode may be set. That is, the second voltage threshold value V2 may be set in all of the plurality of modification modes, and the second voltage threshold value V2 may be set in some of the modification modes, and the first voltage threshold value V1 may be set in the other modification modes. Further, when the second voltage threshold value V2 is set in the plurality of modification modes, the second voltage threshold value V2 may be a voltage value which is lower than the first voltage threshold value V1, and may be set to a different voltage value in each of the modification modes.

The time controller 20 switches from the time display mode to each of the modification modes in accordance with the operation of the operation device 10. That is, in the time display mode, the time controller 20 switches to each of the modification modes in accordance with an operation in which the crown 11 is drawn to the two-stage position, an operation in which the crown 11 is pushed to the one-stage position, an operation in which the button 12 and the button 13 are operated for a predetermined time while the crown 11 is located in the zero-stage position, and the like.

In addition, in a case in which each of the modification modes is ended, that is, in a mode in which the time is manually modified or a mode in which the date is modified, when the crown 11 is pushed into the zero-stage position, the reception is performed in the forced reception mode, and in a case in which a process such as time modification is ended, in the time difference modification mode or the reference alignment mode, when a modification operation is not performed for a predetermined period of time or more, or when a predetermined operation is performed by the button 12 or the button 13, each of the modification modes is switched to the time display mode in the time controller 20.

When an alarm setting mode for setting an alarm time and setting ON and OFF of the alarm by operating the operation device 10 and moving each of the hands is provided, or when a chronograph mode which is shifted by operating the operation device 10 is provided, the alarm setting mode and the chronograph mode may also be included in the modification mode.

In a specific operation in the modification mode, for example, an indication of each of the hands may be modified by pushing the buttons 12 and 13, and an indication of each of the hands may be modified by a rotation operation of the crown 11 using an electronic crown which can detect a rotation direction and an amount of operation as the crown 11.

When the modification operation of each of the hands is performed in the operation device 10, the internal time stored in the internal time data 520 is modified in accordance with an input modification amount. When the internal time is modified, the display controller 25 moves each of the hands to a position corresponding to the internal time at a speed faster than the hand movement speed of each of the hands in the time display mode. As a result, the indication of each of the hands can be modified by operation of the operation device 10.

When the normal operation mode is switched to the power saving mode, the display controller 25 stops at least a part of the hands of the display device 70, and performs the power saving mode with less power consumption than in the normal operation mode in the time display mode.

In the present embodiment, during performance of the power saving mode, the display controller 25 stops driving of the minute hand 6, the hour hand 7, and the date indicator 8 of the display device 70, and the second hand 5 is moved to a predetermined position at which the power saving mode is indicated, for example a position of 45 seconds and is then stopped. In addition, the time measurement controller 23 continues the time measurement of the internal time and updates the internal time data 520.

In other words, in the power saving mode, the current time measurement based on a reference clock pulse continues in the time measurement controller 23, and the internal time data 520 also updates the current time in conjunction therewith. On the other hand, the display controller 25 operates a stepping motor for the second hand until the second hand 5 moves to a predetermined position, and then stops the stepping motor for the second hand when the second hand 5 is moved to the predetermined position. Also, the display controller 25 stops each of the stepping motors for moving the minute hand 6, the hour hand 7, and the date indicator 8 at a time when the mode has been transitioned to the power saving mode.

In the power saving mode, even when the reception of the standard radio wave in the receiver 60 is stopped and the preset automatic reception time is reached, or even when a manual reception operation is performed by operating the button 12, the time controller 20 does not perform the reception operation of the standard radio wave.

Thus, during performance of the power saving mode, power consumption is significantly reduced compared to the normal operation mode.

Figure 6:
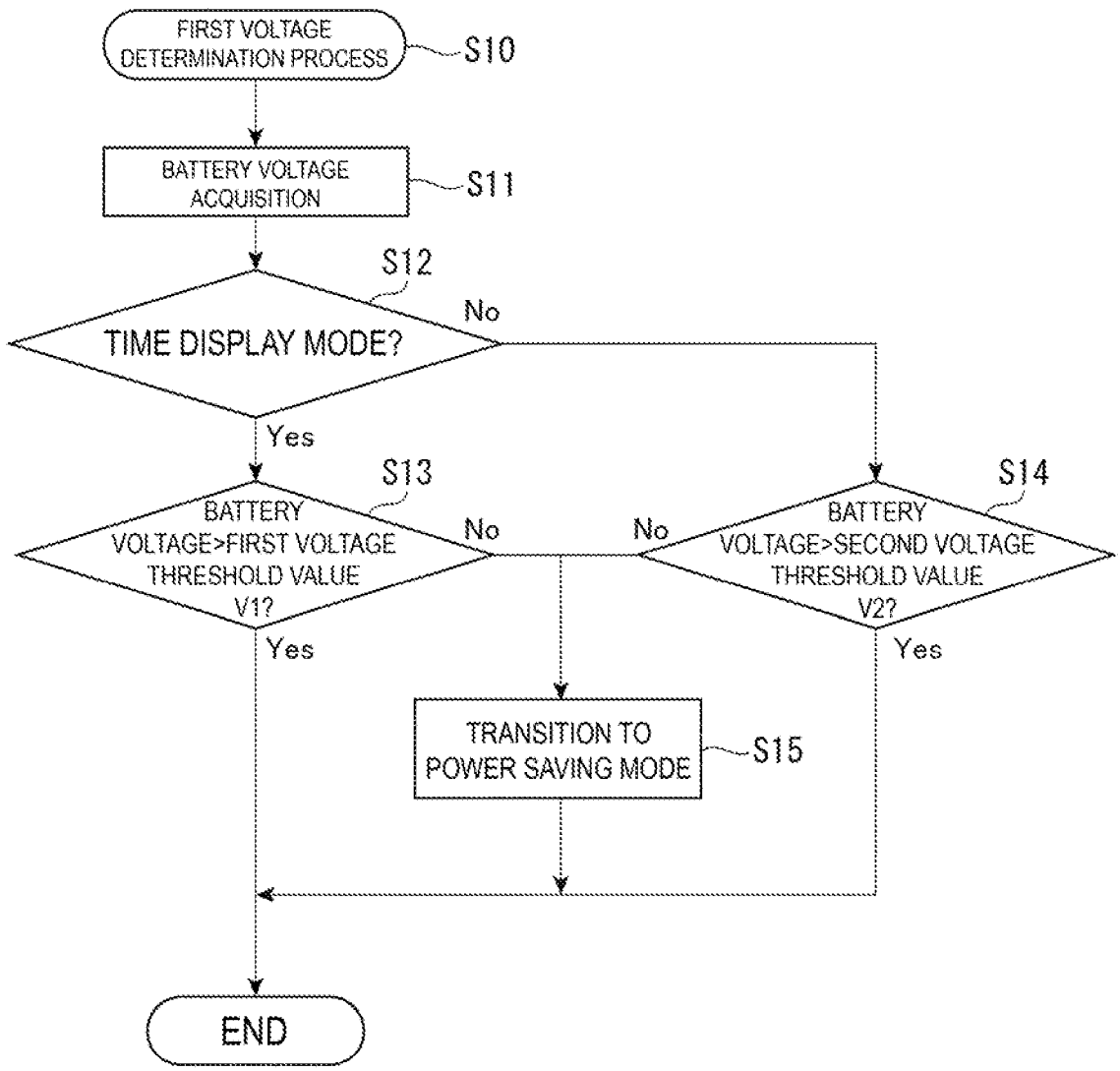
FIG. 6 is a flowchart showing a first voltage determination process.

Next, control in the time controller 20 of the present embodiment will be described based on a flowchart of FIG. 6.

When the control is started, the time controller 20 performs a first voltage determination process of Step S10 at a constant period. For example, the constant period is set to a preset time interval, for example, a 10 second interval, when the time display mode is performed. In addition, in the modification mode, in addition to the period according to a preset time interval, when the fast-forward operation is performed, a time interval in which the number of drive pulses of a predetermined stepping motor becomes a predetermined number is set. For example, when the minute hand 6 and the hour hand 7 are driven by one stepping motor, and the stepping motor for the hour and minute hands is driven at a hand movement frequency for fast-forwarding of, for example, 80 Hz, a period during performance of the fast-forward operation is set at a time interval at which the number of drive pulses is 300, that is, 300/80=3.75 seconds interval.

That is, in the present embodiment, the first voltage determination process of Step S10 is performed at a set time interval such as 10 second interval during the time display mode, and is also performed at a time interval in which the number of drive pulses becomes a predetermined number during the fast-forward operation, in addition to it being performed at a set time interval such as 10 second interval during the modification mode.

When the time controller 20 starts the first voltage determination process S10, Step S11 is performed, and the battery voltage of the rechargeable battery 30 is acquired by the voltage detection controller 21.

Next, the time controller 20 performs Step S12 and determines whether the mode which is currently performed is the time display mode.

When YES is determined in Step S12, the time controller 20 performs Step S13 and determines whether the battery voltage acquired in Step S11 is higher than the first voltage threshold value V1 which is a determination threshold value in the time display mode.

Further, when the mode which is currently performed is the modification mode and NO is determined in Step S12, the time controller 20 performs Step S14, and determines whether the battery voltage acquired in Step S11 is higher than the second voltage threshold value V2 which is a determination threshold value in the modification mode.

When YES is determined in Step 13 or Step 14, the time controller 20 stops the first voltage determination process S10. Thus, the normal operation mode is continued.

Additionally, when No is determined in Step S13 or Step S14, the time controller 20 performs Step S15, and the first voltage determination process S10 is ended by the transition from the normal operation mode to the power saving mode.

When the first voltage determination process S10 is ended in the normal operation mode, the time controller 20 performs the first voltage determination process S10 again after a certain period. In other words, the time controller 20 performs the first voltage determination process S10 at a constant period while the normal operation mode continues.

On the other hand, after the transition to the power saving mode, when the charging controller 22 determines that the charging is performed by the charger 40, the time controller 20 acquires the battery voltage at a constant period, for example, at a 10 second interval, when the acquired battery voltage exceeds the power save release voltage threshold value, the normal operation mode is transitioned to, and when the acquired battery voltage is less than or equal to the power save release voltage threshold value, the power saving mode continues. In this way, the current consumption can be curbed by limiting the process in which the battery voltage is acquired during the power saving mode to during the charging.

Because the power save release voltage threshold value is a voltage value which is higher than the first voltage threshold value V1 and the second voltage threshold value V2, even when the battery voltage returns to the second voltage threshold value V2 or the first voltage threshold value V1 or higher, the time controller 20 continues the power saving mode until the power save release voltage threshold value is exceeded, and when the power save release voltage threshold value is exceeded, the normal operation mode is shifted to.

When the power saving mode is shifted to the normal operation mode during the time display mode, the display controller 25 moves the second hand 5, the minute hand 6, the hour hand 7, and the date indicator 8 in fast-forward to a position at which the internal time data 520 which has continued the time measurement even during the power saving mode is indicated, and then the normal operation mode in which the current time is indicated by the second hand 5, the minute hand 6, the hour hand 7, and the date indicator 8 is continued.

Also, when the power saving mode is shifted to the normal operation mode during the modification mode, the time controller 20 continues the operation of the modification mode.

Operations and Effects of First Embodiment

According to the first embodiment, the second voltage threshold value V2 at which the normal operation mode is shifted to the power saving mode during the modification mode is set to less than the first voltage threshold value V1 at which the normal operation mode is shifted to the power saving mode during the time display mode. Thus, when the normal operation mode of the time display mode is operated, even if the user operates the operation device 10 to shift to the modification mode, the battery voltage maintains the second voltage threshold value V2 or higher. Thus, even if the user operates the operation device 10 to shift to the modification mode, immediately shifting to the power saving mode can be prevented, and it is possible to reliably carry out modification work of the hands.

In addition, in the modification mode, fast-forwarding of the hands may be performed by the operation of the operation device 10 or the like. When the fast-forwarding of the hands is performed, the battery voltage of the rechargeable battery 30 temporarily drops, but a battery voltage equal to or greater than the first voltage threshold value V1 is ensured until immediately before shifting to the modification mode, and thus a significant voltage drop below the second voltage threshold value V2 does not occur even when the battery voltage drops, and when the fast-forward movement is ended, the battery voltage rises, and normally, the battery voltage can be returned to the first voltage threshold value V1 or higher in the time display mode. Then, in the modification mode, because an amount of fast-forwarding of the hands changes in accordance with the user of the electronic watch 1 and the situation, the second voltage threshold value V2 in the modification mode can be set to at least a voltage guaranteeing motor operation such that performance of the modification mode is not hindered as far as possible.

Furthermore, because it is possible to prevent the shifting to the power saving mode as much as possible, a reduction in a time display period for performing the time display mode can be prevented.

Because the first voltage determination process S10 is performed at a constant period, such as a 10 second interval, the voltage of the rechargeable battery 30 can be constantly monitored. Thus, a change in the battery voltage can be detected in near real time, and a mode transition near a set voltage threshold value is allowed.

In addition, during the fast-forward of the hands, the first voltage determination process S10 is performed at a time interval at which the number of drive pulses is a predetermined number, and thus even if the battery voltage suddenly drops due to the fast-forward of the hands, the change can be detected, and a mode transition can be prevented at a voltage which is deviated from the voltage threshold value.

Furthermore, when an operation in which the hands are moved is not performed even after the shifting to the modification mode, the first voltage determination process S10 is performed at a constant period such as the 10 second interval, and thus a change in the battery voltage can be detected even while the hands are not fast-forwarding. Moreover, during the performance of the modification mode, power saving can be achieved as compared with a case in which a change in the battery voltage is detected at a short time interval, for example, for about 3 to 4 seconds even while the hands are not fast-forwarding.

Second Embodiment

Next, a second embodiment will be described. The second embodiment will be described with reference to a control flow shown in FIG. 7 because only a control flow is different from that in the first embodiment.

Figure 7:
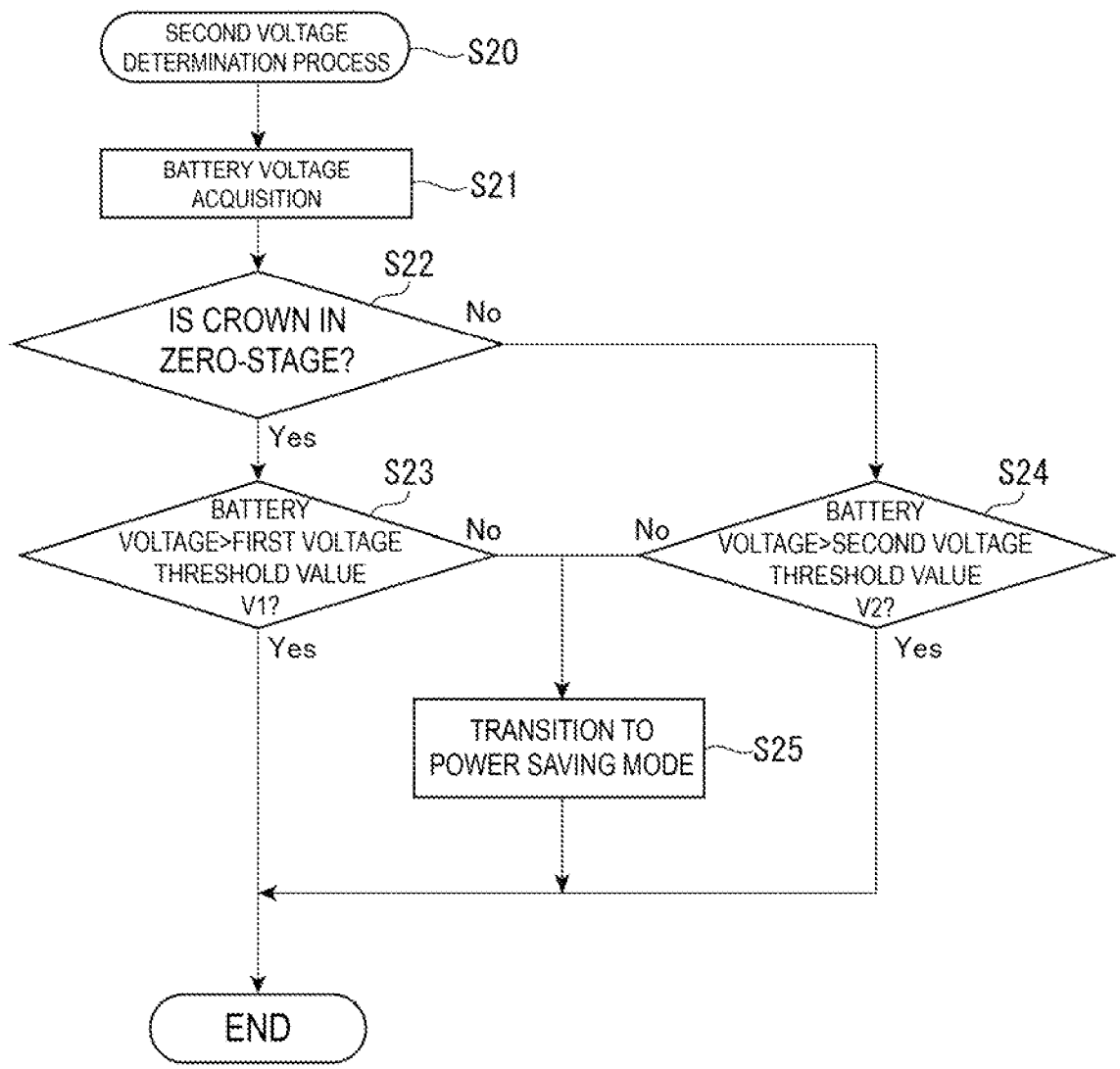
FIG. 7 is a flowchart showing a second voltage determination process.

As shown in FIG. 7, similar to the first voltage determination process S10, the time controller 20 performs a second voltage determination process of Step S20 at a constant period while the time modification mode or the modification mode is performed.

When the second voltage determination process S20 is performed, the time controller 20 performs Step S21 and acquires the battery voltage of the rechargeable battery 30 in the same manner as in Step S11 of the first embodiment.

Next, the time controller 20 performs Step S22 and determines whether the crown 11 is in the zero-stage position, that is, the pressed position. In the second embodiment, similar to the electronic watch 1 of the first embodiment, the time display mode is set in the zero-stage position in which the crown 11 is in the pressed position, and the modification mode which modifies the date is set in the one-stage position which is the drawn position, and the modification mode which modifies the time is set in the two-stage position which is the drawn position.

When YES is determined in Step S22, the time controller 20 performs Step S23 and determines whether the battery voltage acquired in Step S21 is higher than the first voltage threshold value V1 which is a determination threshold value in the time display mode.

When NO is determined in Step S22, the time controller 20 performs step S24 and determines whether the battery voltage acquired in Step S21 is higher than the second voltage threshold value V2 which is a determination threshold value during the modification mode.

When YES is determined in Step S23 or Step S24, the time controller 20 ends the second voltage determination process S20. Thus, the normal operation mode is continued.

Further, when NO is determined in Step S23 or Step S24, the time controller 20 performs Step S25, and the second voltage determination process S20 is ended by transitioning from the normal operation mode to the power saving mode.

The fact that the second voltage determination process S20 is performed at a constant period while the normal operation mode is performed, the operation in the power saving mode, and also the process in which the power saving mode is shifted to the normal operation mode are the same as those in the first embodiment, and thus descriptions thereof will be omitted.

Operations and Effects of Second Embodiment

Also in the second embodiment, the same operations and effects as in the first embodiment can be acquired.

In the second embodiment, whether it is in the time display mode is determined in accordance with the position of the crown 11, and thus, in particular, when the crown 11 is forgotten to be returned to the zero-stage position and is left unattended in a state in which the crown 11 is drawn, the transition to the power saving mode can be prevented until the battery voltage drops to be equal to or less than the second voltage threshold value V2.

Third Embodiment

Next, a third embodiment will be described. The third embodiment will be described with reference to a control flow shown in FIG. 8 because only a control flow is different from those in the first and second embodiments.

Figure 8:
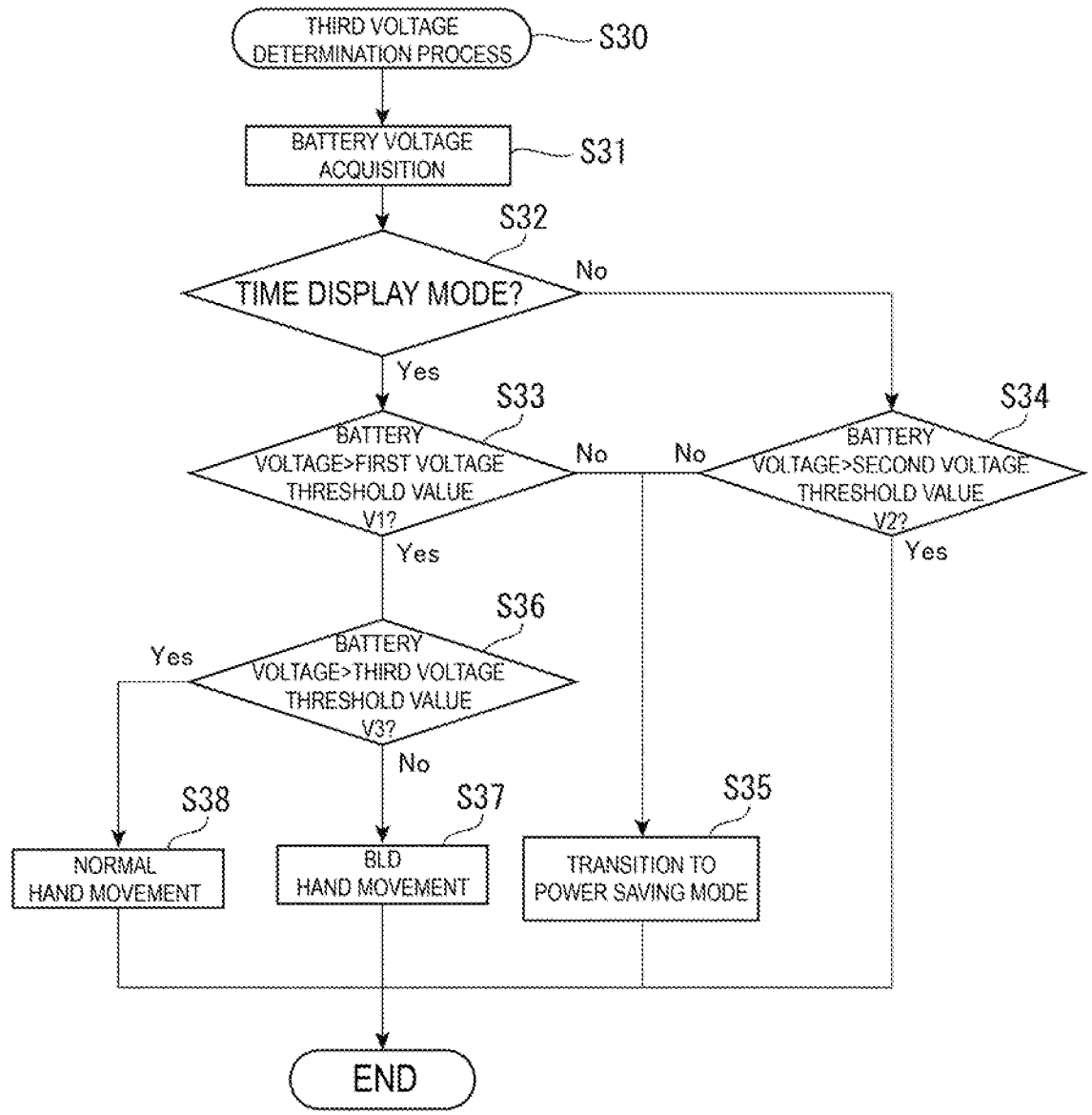
FIG. 8 is a flowchart showing a third voltage determination process.

As shown in FIG. 8, similar to the first voltage determination process S10, the time controller 20 performs a third voltage determination process of Step S30 at a constant period while the time modification mode or the modification mode is performed.

When the third voltage determination process S30 is performed, the time controller 20 performs Step S31 and acquires the battery voltage of the rechargeable battery 30 in the same manner as in Step S11 of the first embodiment.

Next, the time controller 20 performs Step S32 and determines whether the current operation mode is the time display mode, similar to Step S12 of the first embodiment.

When YES is determined in Step S32, the time controller 20 performs Step S33 and determines whether the battery voltage acquired in Step S31 is higher than the first voltage threshold value V1 which is a determination threshold value in the time display mode.

Further, when NO is determined in Step S32, the time controller 20 performs Step S34 and determines whether the battery voltage acquired in Step S31 is higher than the second voltage threshold value V2 which is a determination threshold value during the modification mode.

When NO is determined in Step S33 or Step S34, the time controller 20 performs Step S35, and the third voltage determination process S30 is ended by transitioning from the normal operation mode to the power saving mode.

When YES is determined in Step S33, the time controller 20 performs Step S36 and determines whether the acquired battery voltage is higher than the third voltage threshold value V3. The third voltage threshold value V3 is a threshold value for determining whether a battery low display (BLD) hand movement for alerting that the battery voltage has dropped is performed, and is set to a voltage value which is higher than the first voltage threshold value V1 and lower than the power save release voltage threshold value.

When NO is determined in Step S36, that is, when it is in the time display mode and the acquired battery voltage is higher than the first voltage threshold value V1 and less than or equal to the third voltage threshold value V3, the time controller 20 performs a BLD hand movement mode of Step S37. In the BLD hand movement mode notifying that the battery voltage has dropped, the display controller 25 performs the BLD hand movement and ends the third voltage determination process S30. The BLD hand movement is a hand movement which indicates that the battery voltage has dropped, and the second hand 5 is moved at intervals of 2 seconds or more, for example, 2 second intervals or 5 second intervals. In the BLD hand movement, the minute hand 6 and the hour hand 7 are moved as usual. The BLD hand movement mode is also referred to as a battery low display mode, a battery life indicator, or the like.

When YES is determined in Step S36, that is, when it is in the time display mode, and the acquired battery voltage is higher than the third voltage threshold value V3, the time controller 20 performs Step S38, performs a normal hand movement, and ends the third voltage determination process S30.

The fact that the third voltage determination process S30 is performed at a constant period while the normal operation mode is performed, the operation in the power saving mode, and the process in which the power saving mode is shifted to the normal operation mode are the same as those in the first embodiment, and thus descriptions thereof will be omitted.

Operations and Effects of Third Embodiment

In the third embodiment, the same operations and effects as in the first embodiment can be acquired.

In the third embodiment, during the normal operation mode of the time display mode, because the BLD hand movement is performed when the voltage drops to be equal to or less than the third voltage threshold value V3, the user can easily confirm that the battery voltage drops, and it is possible to prompt the user for performing the charging with the charger 40. Thus, it is possible to reduce the frequency of a situation in which the electronic watch 1 suddenly enters the power saving mode and cannot be used.

Fourth Embodiment

Figure 9:
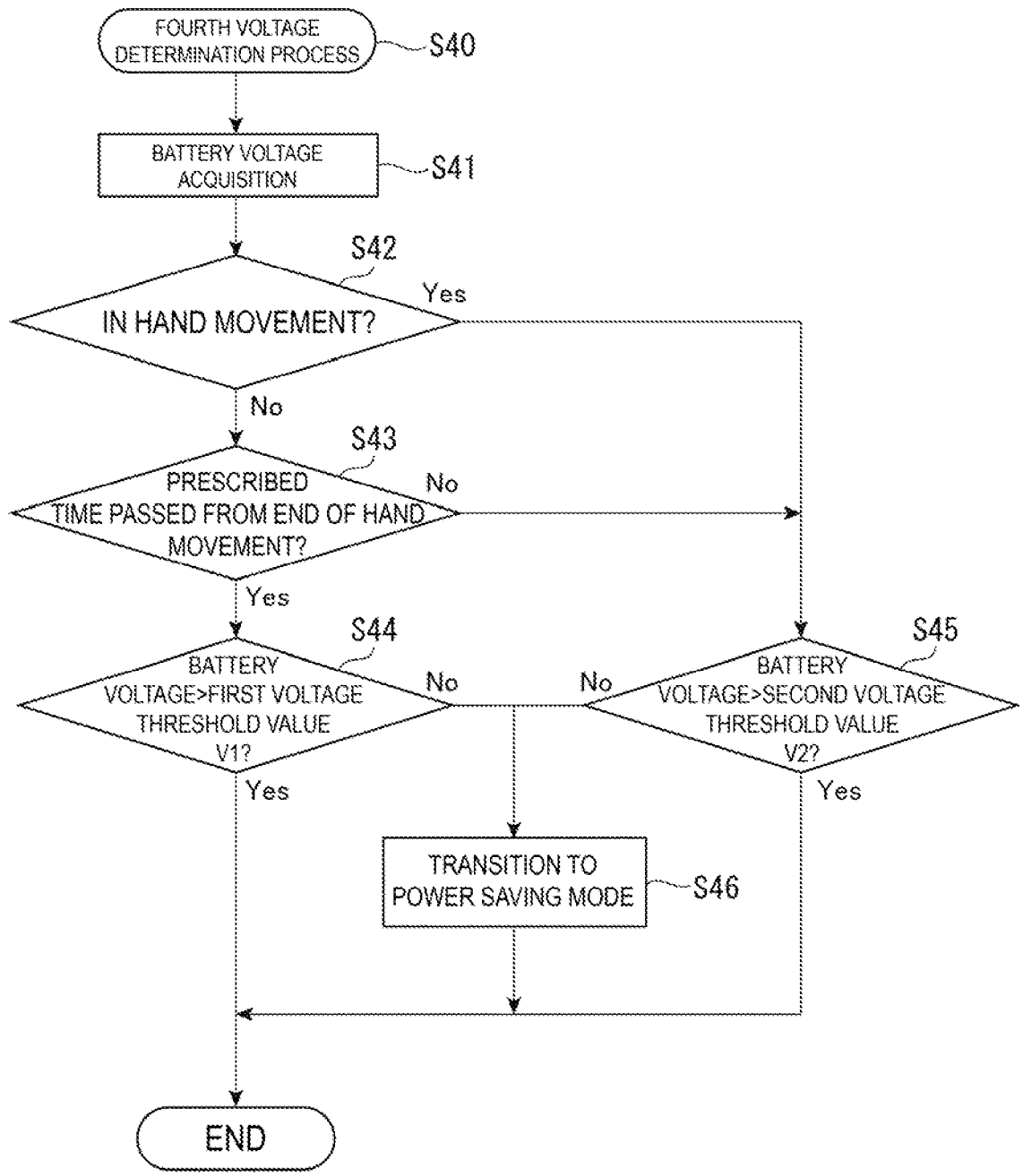
FIG. 9 is a flowchart showing a fourth voltage determination process.

Next, a fourth embodiment will be described. The fourth embodiment is different from each of the above-described embodiments in a battery voltage determination process in the modification mode. Thus, the battery voltage determination process in the modification mode will be described with reference to FIG. 9.

Similar to the first voltage determination process S10, the time controller 20 performs a fourth voltage determination process of Step S40 at a constant period during the performance of the modification mode.

When the fourth voltage determination process S40 is performed, the time controller 20 performs Step S41 and acquires the battery voltage of the rechargeable battery 30 in the same manner as in Step S11 of the first embodiment.

Next, the time controller 20 performs Step S42 and determines whether the hands are moved. The time controller 20 determines YES in Step S42 when the hand movement such as the fast-forward of the hands is performed during the modification mode, and determines NO in Step S42 when the hands are stopped during the modification mode.

When NO is determined in Step S42, the time controller 20 performs Step S43 and determines whether a prescribed time has passed since the end of the hand movement in the modification mode. Here, the prescribed time is set in accordance with voltage return characteristics or the like of the rechargeable battery 30, and the prescribed time is set in a range of 10 seconds to 60 seconds, for example.

When YES is determined in Step S43, that is, when a prescribed time has passed since the end of the hand movement in the modification mode, the time controller 20 performs Step S44 and determines whether the battery voltage acquired in Step S41 is higher than the first voltage threshold value V1.

When NO is determined in Step S43, that is, when a prescribed time has not passed since the end of the hand movement in the modification mode, and when YES is determined in Step S42, the time controller 20 performs Step S45 and determines whether the battery voltage acquired in Step S41 is higher than the second voltage threshold value V2.

Thus, for example, when the fourth voltage determination process S40 is performed at 10 second intervals in the modification mode and 60 seconds are set as the prescribed time, Step S45 is performed six times from the end of the hand movement in the modification mode, and when 60 seconds have passed from the end of the hand movement and the hands are not moved, Step S44 is performed even if the modification mode continues.

When YES is determined in Step S44 or Step S45, the time controller 20 ends the processing of the fourth voltage determination process S40.

Furthermore, when NO is determined in Step S44 or Step S45, the time controller 20 performs Step S46, and ends the fourth voltage determination process S40 by transitioning from the normal operation mode to the power saving mode. The operation in the power saving mode, and the process in which the power saving mode is shifted to the normal operation mode are the same as those in the first embodiment, and thus descriptions thereof will be omitted.

Then, the time controller 20 performs the fourth voltage determination process S40 when the modification mode is continued after a timing of a next voltage determination process, that is, after a certain period, and performs any one of the voltage determination processes S10, S20, and S30 in the first to third embodiments when the time display mode is returned.

Operations and Effects of Fourth Embodiment

In the fourth embodiment, when the voltage of the rechargeable battery 30 drops due to a fast-forward modification operation of the hands or the like in the modification mode, the battery voltage is compared with the second voltage threshold value V2 in Step S45 until a prescribed time has passed from the end of the hand movement, and thus the transitioning to the power saving mode can be prevented.

Also, when the hands are not moved and the prescribed time has passed from the end of the hand movement, the battery voltage is compared with the first voltage threshold value V1 in Step S44, and thus the transitioning to the power saving mode is performed when the dropped battery voltage does not return to a voltage value higher than the first voltage threshold value V1 even if the prescribed time has passed since the end of the hand movement. For example, normally as described in FIG. 5, although the battery voltage gradually returns upon the end of the hand movement, when an abnormality such as a case in which the battery is deteriorated occurs, the battery voltage may not return. Thus, the user can early detect a possibility of an abnormality occurring in the rechargeable battery 30 or the charger 40.

OTHER EMBODIMENTS

The present disclosure is not limited to each of the above-described embodiments, and modifications, improvements, and the like within the scope in which the object of the present disclosure can be achieved are included in the present disclosure.

For example, the operation in the power saving mode is not limited to the example of the above-described embodiment. For example, a power saving mode in which only the second hand 5 is stopped, and the operations of the minute hand 6, the hour hand 7, and the date indicator 8 are continued may be employed. Because the second hand 5 is moved every 1 second, the power consumption per unit time is high compared to other hands. Thus, the power consumption can be reduced by stopping only the second hand 5 during the power saving mode.

In the above-described embodiments, both the crown 11 and the buttons 12 and 13 are provided as the operation device 10, but only one of them may be provided. When only a button is provided, the electronic watch can be configured with a relatively simple structure as compared to when the crown is provided.

Further, in a case in which the time display mode is switched to the modification mode by the operation of the button, the switching from the modification mode to the time display mode may be automatically performed when an operation of the button has not been performed for a predetermined time, or may be performed when the predetermined operation of the button is performed again. In a case in which the modification mode is switched to the time display mode by an operation of the button, the transition to the power saving mode can be prevented until the battery voltage drops to be equal to or less than the second voltage threshold value when the operation of the button is not performed and the modification mode is maintained. Also, because the operation of the button is relatively easy compared to an operation of the crown, the user can switch from the time display mode to the modification mode relatively easily.

In the above-described embodiment, in the power saving mode, although update of the internal time data 520 has been continuously performed by the time measurement controller 23, the update of the internal time data 520 may also be stopped in addition to stopping the movement of each of the hands. In this case, the power consumption can be further reduced. If the update of the internal time data 520 is stopped, the current time cannot be displayed correctly when the battery voltage exceeds the power save release voltage threshold value, and the normal operation mode is returned. Therefore, at the time of the return to the normal operation mode, automatic reception of the standard radio wave may be performed, the internal time data 520 may be updated with the received time information, and the current time may be displayed by the display device 70. When the automatic reception fails, time setting may be manually performed.

Examples of modification modes are not limited to those described in the embodiments. For example, processes in which a flag for setting ON or OFF of a reception prohibition mode, a flag for setting ON or OFF of performance of an alarm function, and the like are changed by the operation of the operation device 10 are also included in the modification mode. This is because, when these operations are performed, the second hand 5 is moved in fast forward to a position at which it indicates ON or OFF, and performs an indication operation.

In other words, the modification mode is a mode in which at least one hand can be moved in accordance with the operation of the operation device 10.

Further, in the electronic watch 1, when a plurality of modification modes are set, the second voltage threshold value V2 may be set for each of the modification modes.

In each of the above-described embodiments, in the modification mode, although the voltage threshold value for transitioning to the power saving mode is common to the second voltage threshold value V2, regardless of whether the hands are fast-forwarding, the present disclosure is not limited thereto. For example, a second voltage threshold value V21 when the hands are fast-forwarding and a second voltage threshold value V22 when the hands are not fast-forwarding may be set as the second voltage threshold value V2 which determines a voltage for transitioning to the power saving mode in a modification mode, and the second voltage threshold values V21 and V22 may be set to different voltage values. For example, according to the battery characteristics of the rechargeable battery 30, the second voltage threshold value V22 may be set to a voltage value which is higher than the second voltage threshold value V21 in accordance with a voltage return capability.

The electronic watch of the present disclosure is not limited to that a receiving device configured to receive a standard radio wave is included, and may be an electronic watch including a receiving device configured to receive various types of electromagnetic waves including time information, or an electronic watch in which time modification is performed by a manual operation without the receiving device.

Summary of Present Disclosure

The electronic watch of the present disclosure includes a plurality of hands, a rechargeable battery, a battery voltage detection controller which detects a voltage of the battery, an operation device including a crown or a button, a controller which performs switching between a time display mode which displays a time, a modification mode in which at least one of the hands is moved in accordance with an operation of the operation device, and a power saving mode in which less power is consumed than in the time display mode by stopping at least some of the hands, wherein the controller switches to the power saving mode when a battery voltage detected by the battery voltage detection controller is detected to be less than a first voltage threshold value while the time display mode is performed, and switches to the power saving mode when the battery voltage is detected to be less than a second voltage threshold value that is lower than the first voltage threshold value while the modification mode is performed.

According to the electronic watch of the present disclosure, the second voltage threshold value at which the normal operation mode is shifted to the power saving mode during the modification mode is less than the first voltage threshold value at which the normal operation mode is shifted to the power saving mode during the time display mode. Thus, when the normal operation mode of the time display mode is performed, the battery voltage maintains the second voltage threshold value or higher even if the user operates the operation device to shift to the modification mode. Accordingly, even if the user operates the operation device to shift to the modification mode, the immediate shift to the power saving mode can be prevented, and the modification operation of the hands can be reliably performed.

In the electronic watch of the present disclosure, the operation device includes a crown, the crown is configured to be movable to at least a pressed position and a drawn position, and the controller performs the time display mode when the crown is located in the pressed position, and performs the modification mode when the crown is located in the drawn position.

According to the electronic watch of the present disclosure, because it is determined whether the time display mode is performed in accordance with a position of the crown, the transition to the power saving mode can be prevented until the battery voltage drops to be equal to or less than the second voltage threshold value, in particular, when the crown is forgotten to be returned to the pressed position and is left unattended in a state in which it is drawn.

In the electronic watch of the present disclosure, the operation device includes the button, and the controller switches the time display mode to the modification mode in accordance with an operation of the button, and performs the modification mode.

According to the electronic watch of the present disclosure, because the switching from the time display mode to the modification mode is performed in accordance with the operation of the button, the user is allowed to easily switch to the modification mode.

In an electronic watch of the present disclosure, a time measurement controller which measures an internal time is provided, the time display mode displays a time based on the internal time with the hands, and in the modification mode, the internal time is modified in accordance with an operation of the operation device, and the hands are moved to positions corresponding to the internal time at a speed faster than a hand movement speed in the time display mode.

According to the electronic watch of the present disclosure, when the fast-forward of the hands is performed in the modification mode, the battery voltage temporarily drops, but the battery voltage equal to or higher than the first voltage threshold value is ensured until immediately before the shifting to the modification mode, thus there is no significant voltage drop below the second voltage threshold value even if the battery voltage drops, and when the movement in fast forward is ended, the battery voltage rises, and the battery voltage can normally be returned to be equal to or higher than the first voltage threshold in the time display mode. Then, in the modification mode, because an amount of fast-forward of the hands and a frequency of fast-forward is changed in accordance with the user of the electronic watch or the situation, the second voltage threshold value in the modification mode can be set to at least the voltage guaranteeing motor operation such that performance of the modification mode is not hindered as far as possible. In particular, in a modification mode in which the user intentionally modifies an internal value of the watch, for example, the internal time, various modes, and the setting values, the user frequently performs a modification operation and fast-forwards the hands. In the modification mode in which the hands are moved frequently in this way, because the voltage drops temporarily during the fast-forward, when the second voltage threshold value which determines the transition to the power saving mode in the modification mode is the first voltage threshold value in the time display mode, the immediate transition to the power saving mode will be performed. On the other hand, it is possible to avoid power save while a normally-operable voltage is maintained by setting the second voltage threshold value to a voltage below the first voltage threshold value.

In the electronic watch of the present disclosure, the hands include a second hand, and the controller performs a BLD hand movement mode which causes the second hand to move at intervals of 2 seconds or more when the battery voltage detection controller detects that the battery voltage is less than a third voltage threshold value which is higher than the first voltage threshold value while the time display mode is performed.

According to the electronic watch of the present disclosure, in the time display mode, because the BLD hand movement is performed when the battery voltage drops to be equal to or less than the third voltage threshold value, the user can easily confirm that the battery voltage drops, and thus it is possible to promote the user for charging. Thus, it is possible to reduce the frequency of a situation in which an electronic watch suddenly enters the power saving mode and cannot be used.

In the electronic watch of the present disclosure, the battery voltage detection controller detects a voltage of the battery at a constant period.

According to the electronic watch of the present disclosure, because the battery voltage is detected at regular intervals such as 10 second intervals, the battery voltage can be constantly monitored. Thus, a change in the battery voltage can be detected in near real time, it is possible to allow a mode transition near a set voltage threshold value.

In the electronic watch of the present disclosure, the controller switches a threshold value of the battery voltage to the first voltage threshold value after a prescribed time passes from an end of processing of moving at least one of the hands while the modification mode is performed.

According to the electronic watch of the present disclosure, because the threshold value of the battery voltage is switched to the first voltage threshold value when a prescribed time has passed since the end of the hand movement, if the dropped battery voltage does not return to a voltage value higher than the first voltage threshold value even after the prescribed time has passed since the end of the hand movement, the transition to the power save move is performed. Thus, the user can early detect a possibility of an abnormality occurring in the rechargeable battery or the charging device.

In the electronic watch of the present disclosure, the modification mode includes a plurality of modification modes, and the second voltage threshold value which determines a shift from the modification mode to the power saving mode is a threshold value which is lower than the first voltage threshold value and is set for each of the modification modes.

According to the electronic watch of the present disclosure, because the second voltage threshold value which determines the shift from the modification mode to the power saving mode is set for each of the modification modes, the shift to the power saving mode can be appropriately determined in accordance with the characteristics of each of the modification modes.

What is claimed is:

1. An electronic watch comprising:
    a plurality of hands;
    a rechargeable battery;
    a battery voltage detection controller configured to detect a voltage of the battery;
    an operation device including a crown or a button; and
    a controller configured to perform, switching between, a time display mode for displaying a time, a modification mode in which at least one of the hands is moved in accordance with an operation of the operation device, and a power saving mode in which less power is consumed than in the time display mode by stopping at least one of the hands,
    wherein the controller switches to the power saving mode when a battery voltage detected by the battery voltage detection controller is detected to be less than a first voltage threshold value while the time display mode is performed, and switches to the power saving mode when the battery voltage is detected to be less than a second voltage threshold value that is lower than the first voltage threshold value while the modification mode is performed.

2. The electronic watch according to claim 1, wherein:
    the operation device includes a crown, the crown is configured to be movable to a pressed position and a drawn position, and the controller performs the time display mode when the crown is located in the pressed position, and performs the modification mode when the crown is located in the drawn position.

3. The electronic watch according to claim 1, wherein:

the operation device includes the button, and the controller performs the modification mode switching from the time display mode in accordance with an operation of the button.

4. The electronic watch according to claim 1, wherein:

a time measurement controller configured to measure an internal time is provided, in the time display mode, a time is displayed with the hands based on the internal time, and in the modification mode, the internal time is modified in accordance with an operation of the operation device, and the hands are moved to a position corresponding to the internal time at a speed faster than a hand movement speed in the time display mode.

5. The electronic watch according to claim 1, wherein:

the hands include a second hand, and the controller performs a battery low display hand movement mode that causes the second hand to move at intervals of 2 seconds or more when the battery voltage detection controller detects that the battery voltage is less than a third voltage threshold value that is higher than the first voltage threshold value while the time display mode is performed.

6. The electronic watch according to claim 1, wherein:

the battery voltage detection controller detects a voltage of the battery at a constant period.

7. The electronic watch according to claim 1, wherein:

the controller switches a threshold value of the battery voltage to the first voltage threshold value after a prescribed time passes from an end of processing of moving at least one of the hands while the modification mode is performed.

8. The electronic watch according to claim 1, wherein:

the modification mode includes a plurality of modification modes, and the second voltage threshold value for determining a shift from the modification mode to the power saving mode is a threshold value that is lower than the first voltage threshold value and is set for each of the modification modes.

* * * * *